Nov. 28, 1944.  M. VARGA  2,364,039
LAWN MOWER
Filed May 10, 1943  2 Sheets-Sheet 2
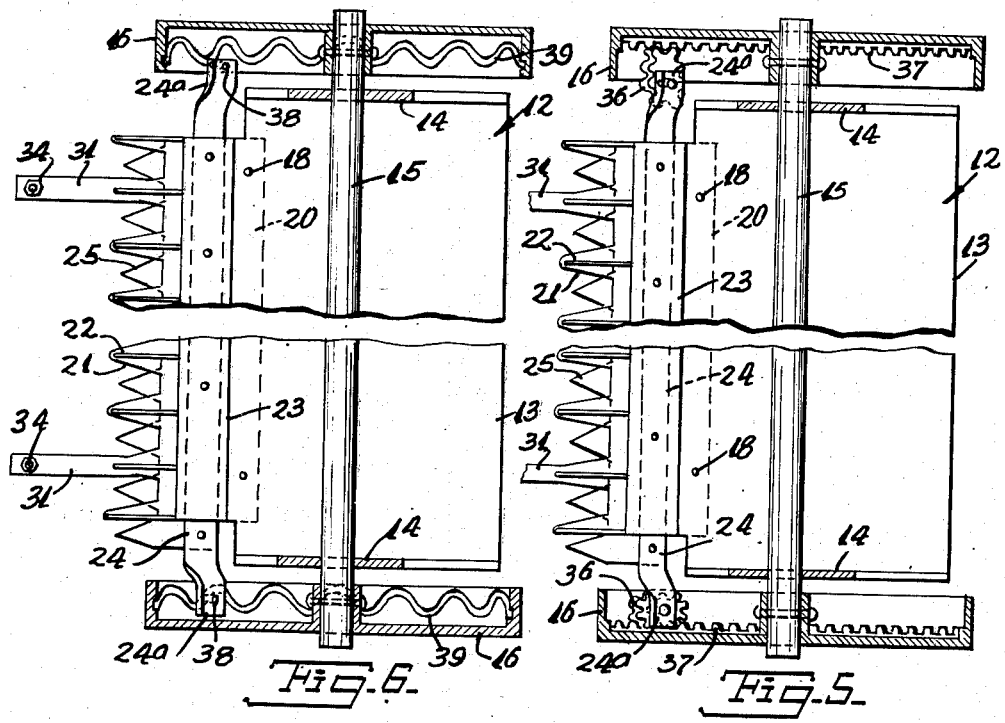
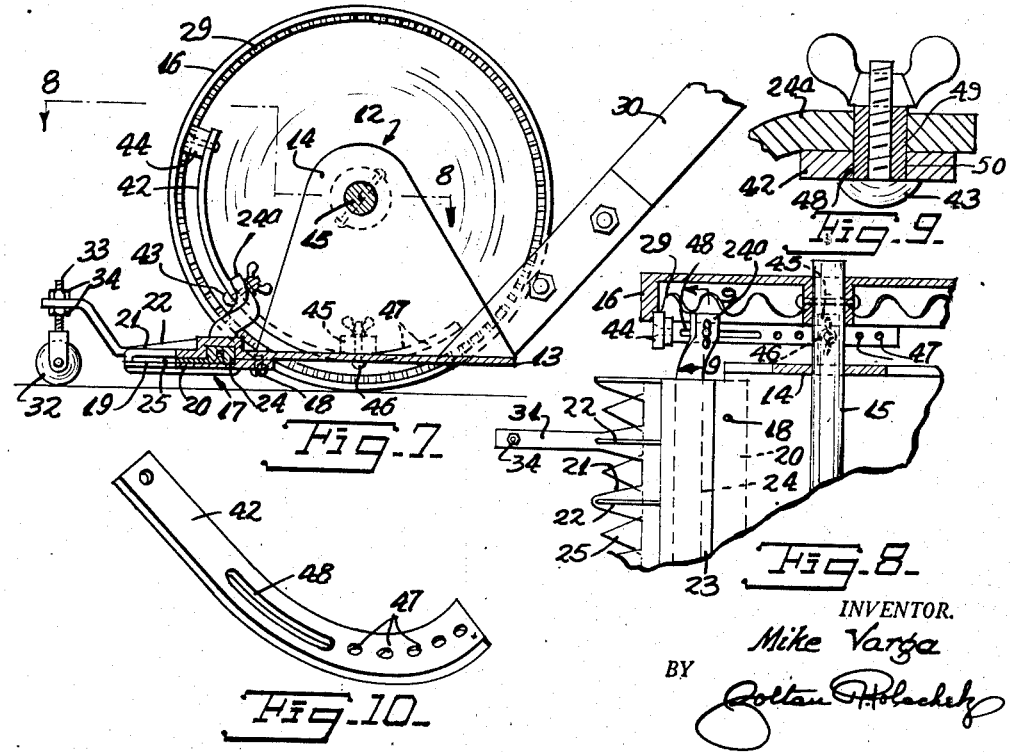
INVENTOR.
Mike Varga
BY
ATTORNEY Patented Nov. 28, 1944

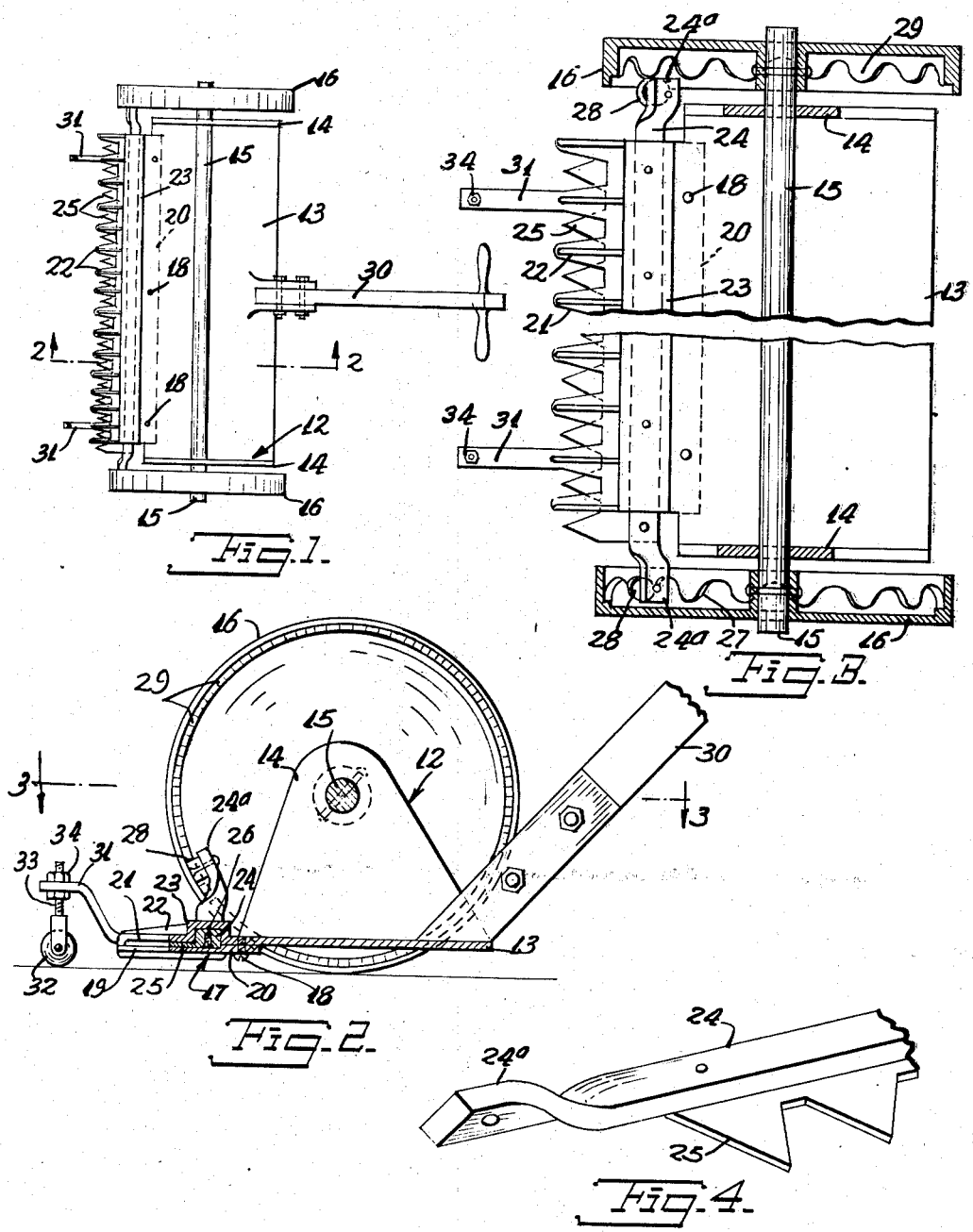

2,364,039

UNITED STATES PATENT OFFICE 2,364,039

LAWN MOWER

Mike Varga, New York, N. Y.

Application May 10, 1943, Serial No. 486,323

3 Claims. (Cl. 56—263)

This invention relates to new and useful improvements in lawn mowers.

More particularly, the invention proposes a lawn mower which is characterized by a frame having a bottom wall and side walls with an axel rotatively supported through the side walls and provided with wheels for engaging the ground by which the frame may be moved around. It is further proposed that a tooth-like cutter member be mounted on the front of said bottom wall and be cooperative with a tooth-like cutter blade which is transversely slidably mounted thereon. It is still further contemplated to attach a transverse bar to the blade, and have its ends projecting and cooperative with means for oscillating the blade, operating between the ends of said bar and said wheels. More specifically, it is proposed to characterize the oscillating means by wavy-like cam portions on the said wheels and set one half wave length back of each other.

In another form of the invention it is proposed to use elliptical gears mounted on said bar and cooperative with gear teeth on the wheels.

In another form of the invention it is proposed to use groove-like cams.

Another modified form is proposed in which it is possible to adjust the amplitude of oscillation of said blade.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a lawn mower constructed in accordance with this invention.

Fig. 2 is a fragmentary enlarged longitudinal sectional view taken on the line 2—2 of Fig. 1.

Fig. 3 is a fragmentary horizontal sectional view taken on the line 3—3 of Fig. 2.

Fig. 4 is a perspective view of one end of the transverse bar and the cutter blade used in the lawn mower.

Fig. 5 is a fragmentary sectional view similar to Fig. 3 but illustrating a modified construction.

Fig. 6 is another fragmentary sectional view similar to Fig. 3 but illustrating still another modified construction.

Fig. 7 is a fragmentary longitudinal sectional view similar to Fig. 2 but illustrating a lawn mower constructed in accordance with another modified form of this invention.

Fig. 8 is a fragmentary horizontal sectional view taken on the line 8—8 of Fig. 7.

Fig. 9 is a fragmentary enlarged sectional view taken on the line 9—9 of Fig. 8.

Fig. 10 is a perspective view of a certain lever shown in Figs. 7 and 8.

The lawn mower, in accordance with the form of the invention illustrated in Figs. 1 to 4, includes a frame 12 having a bottom wall 13 and side walls 14. An axle 15 is rotatively mounted through the side walls 15. Wheels 16 are fixedly mounted on the ends of the axle 15 and are located outwards of the said side walls 14. A tooth-like cutter member 17 is mounted on the front of the said bottom wall 13. This member is secured to the bottom face of the bottom wall 13 by several fastening elements 18.

The member 17 has a front portion comprising a plurality of teeth 19 and a back portion 20 in the nature of a base strip. It is this base strip which is secured by the fastening elements 18 to the wall 13. The front end of the bottom wall 13 is formed with teeth-like portions complementary to the tooth-like cutter member 19. More specifically, the front end is provided with complementary teeth 21 superimposed upon the teeth 19 and reinforced with ribs 22. The top wall 13 also is provided with a transverse raised portion 23 forming a groove in which a transverse bar 24 is slidably mounted. There is a small space between the cutter member 19 and the corresponding portion of the bottom face of the wall 13. A tooth-like cutter blade 25 is transversely slidably mounted in this space. The blade 25 is attached to the bar 24 by fastening elements 26. The ends of the bar 24 project from the sides of the wall 13 and are formed with upwardly bent portions 24ª.

Means for oscillating the blade 25 is associated with the ends of the bar 24 and with the said wheels 16. This means includes rollers 28 rotatively mounted upon the end portions 24ª of the said bar 24 and engaging wavy-like cam portions 29 formed upon the adjacent faces of the wheels 16. It should be noted that the wheels 16 are fixed upon the axle 15. It should furthermore be noted that the cam portions 29 of the wheels 16 are set one half wave back of each other so that when one of the wheels 28 rests on a high portion of the cam portions while the other wheel 28 rests in a low portion, see particularly Fig. 3.

A handle 30 extends upwardly and rearwards from the bottom wall 13, by which the lawn mower may be moved around. Several brackets 31 project forwards of certain of the teeth 21 of the wall 13. These brackets 31 support casters 32 which engage the ground. Each of the casters is associated with a screw 33 and nuts 34 by which the casters may be adjusted vertically. This controls the position of the cutter blade 25 from the adjacent ground.

The operation of this form of the invention is as follows:

The lawn mower is moved forwards by the handle 30. The wheels 16 are consequently caused to rotate. The wavy-like cam portions 29 will oscillate the bar 24 and correspondingly oscillate the blade 25. The blades of grass or other vegetation to be cut will enter between the teeth of the tooth-like member 17 and the front of the wall 13, and will be cut off by the oscillating blade 25.

In Fig. 5 a modified form of the invention is disclosed which is very similar to the prior form, distinguishing merely in the fact that elliptical gears 36 are rotatively mounted on the ends 24ª of the bar 24. These gears mesh with complementary gear teeth 37 formed upon the adjacent sides of the wheels 16. The elliptical gears 36 are set one-half turn away from each other. This may be seen by inspecting Fig. 5 and noting that the major axes of these gears are at right angles to each other.

In other respects this form of the invention is identical to the previous form and like parts are identified by like reference numerals.

When this lawn mover is moved the gears 36 will be driven and indirectly cause the bar 24 and the blade 25 to oscillate.

In Fig. 6 another modified form of the invention has been disclosed in which followers 38 are mounted on the ends 24ª of the bar 24 and engage wavy-like cam shaped grooves 39 formed in the adjacent sides of the wheels 16. While two cam grooves 39 has been illustrated it should be recognized that one would be sufficient to operate the device. The other is merely in the nature of an auxiliary. Moreover, if one cam groove 39 is used it is merely necessary to use one operator wheel which preferably is then located between the end wheels 16 on the axle 15.

In other respects this form of the invention is similar to that previously shown and like reference numerals identify like parts in each of the several views.

The operation of this form of the invention is substantially identical to the previous forms, distinguishing in the fact that the cam grooves 39 working against the followers 38 will cause the bar 24 and thus the blade 25 to oscillate.

In Figs. 7–10 still another form of the invention is disclosed which distinguishes from the prior form in the fact that a lever 42 is pivotally mounted by a pintle bolt and nut 43 upon each end 24ª of the bar 24. One of the ends of each lever 42 is provided with a roller 44 which engage the wavy-like cam portions 29. A lug 45 projects from each side wall 14 and supports a pintle bolt and nut 46 which engages one of a series of complementary openings 47 formed in the lever 42.

Each lever 42 is formed with an intermediate elongated slot 48. These slots 48 are aligned with complementary openings 49 formed in the ends of the bar 24. Bushings 50 are freely engaged through the aligned slots 48 and openings 49 and the pintle bolts and nuts 43 engaged thru the bushings. The bushings 50 are slightly longer than the combined thickness of the levers 42 and the ends of the bar 24 prevents the levers and bar from being clamped together by the pintle bolts and nuts 43 providing a sliding and pivoting connection between these parts.

In other respects this form of the invention is similar to that previously shown and like reference numerals identify like parts in each of the several views.

The operation of this form of the invention is substantially the same as the prior forms, distinguishing in the fact that the levers 42 will indirectly transmit the oscillations to the blade 25 at a mechanically varied ratio. The mechanical variation may be controlled by disengaging the bolts and nuts 46 and shifting the levers 42 in one direction or the other and then re-engaging the bolts and nuts 46 through different ones of the openings 47.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A lawn mower having a frame rotatively supporting a pair of wheels formed with wavy-like cam surfaces and a reciprocating blade in position on a fixed blade, arcuate levers positioned adjacent said wheels, means slidably pivotally attaching the ends of said reciprocating blade to intermediate areas of said levers so that said levers may be moved longitudinally relative to the ends of said reciprocating blade, rollers mounted on one of the ends of said levers and engaging said cam surfaces for reciprocating said reciprocating blade as said wheels turn, and means adjustably pivotally attaching the other ends of said levers upon said frame so that the operative length of said levers may be varied to control the length of the stroke of reciprocation of the reciprocating lever.

2. A lawn mower having a frame rotatively supporting a pair of wheels formed with wavy-like cam surfaces and a reciprocating blade in position on a fixed blade, arcuate levers positioned adjacent said wheels, means slidably pivotally attaching the ends of said reciprocating blade to intermediate areas of said levers so that said levers may be moved longitudinally relative to the ends of said reciprocating blade, rollers mounted on one of the ends of said levers and engaging said cam surfaces for reciprocating said reciprocating blade as said wheels turn, and means adjustably pivotally attaching the other ends of said levers upon said frame so that the operative length of said levers may be varied to control the length of the stroke of reciprocation of the reciprocating lever, said first means, comprising bushings engaged through aligned openings formed in the ends of said reciprocating blades and elongated slots formed in the intermediate areas of said levers, and pintle bolts passing through said bushings and having their heads and nuts projected beyond the periphery of said bushings to retain the ends of said reciprocating blade and said levers in position on said bushings.

3. A lawn mower having a frame rotatively supporting a pair of wheels formed with wavy-like cam surfaces and a reciprocating blade in position on a fixed blade, arcuate levers positioned adjacent said wheels, means slidably pivotally attaching the ends of said reciprocating blade to intermediate areas of said levers so that said levers may be moved longitudinally relative to the ends of said reciprocating blade, rollers mounted on one of the ends of said levers and engaging said cam surfaces for reciprocating said reciprocating blade as said wheels turn, and means adjustably pivotally attaching the other ends of said levers upon said frame so that the operative length of said levers may be varied to control the length of the stroke of reciprocation of the reciprocating lever, said latter means, comprising lugs extending from the ends of said frame and formed with openings, said levers having their ends formed with a series of complementary openings, and pintle bolts passing through the openings in said lugs and selectively engageable with one of a series of complementary openings formed in the ends of said levers.

MIKE VARGA.